(12) United States Patent
Wei

(10) Patent No.: US 12,482,516 B2
(45) Date of Patent: Nov. 25, 2025

(54) CIRCUIT FOR RECEIVING DATA AND MEMORY

(71) Applicant: CHANGXIN MEMORY TECHNOLOGIES, INC., Hefei (CN)

(72) Inventor: Bingxin Wei, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 184 days.

(21) Appl. No.: 18/448,944

(22) Filed: Aug. 13, 2023

(65) Prior Publication Data
US 2024/0062807 A1 Feb. 22, 2024

Related U.S. Application Data

(63) Continuation of application No. PCT/CN2022/123902, filed on Oct. 8, 2022.

(30) Foreign Application Priority Data

Aug. 19, 2022 (CN) .......................... 202210998008.6

(51) Int. Cl.
G11C 11/00 (2006.01)
G11C 11/4074 (2006.01)
G11C 11/4093 (2006.01)

(52) U.S. Cl.
CPC ...... G11C 11/4093 (2013.01); G11C 11/4074 (2013.01)

(58) Field of Classification Search
CPC ............ G11C 11/1673; G11C 11/1675; G11C 13/004; G11C 16/26; G11C 29/028;
(Continued)

(56) References Cited

U.S. PATENT DOCUMENTS 6,205,078 B1 * 3/2001 Merritt ................ G11C 7/1084
365/189.09
2021/0174844 A1 6/2021 Choi
(Continued)

FOREIGN PATENT DOCUMENTS

CN 105304137 A 2/2016
CN 112578835 A 3/2021
(Continued)

OTHER PUBLICATIONS

International Search Report in the international application No. PCT/CN2022/123902, mailed on Dec. 21, 2022. 7 Pages with English translation.

Primary Examiner — Thong Q Le
(74) Attorney, Agent, or Firm — Syncoda LLC; Feng Ma

(57) ABSTRACT

A circuit for receiving data includes a voltage generating circuit, a data circuit and a selection circuit. The voltage generating circuit is configured to output, in a first mode, a first reference voltage signal and a second reference voltage signal. The data circuit is configured to compare the data signal with the first reference voltage signal, output a first target signal, compare the data signal with the second reference voltage signal, and output a second target signal. The data signal is one of a plurality of data signals arranged in series. The selection circuit is configured to determine one of the first target signal and the second target signal as a target data signal based on a level state of a previous data signal of the data signal.

16 Claims, 9 Drawing Sheets

(58) Field of Classification Search
CPC . G11C 13/0069; G11C 13/0026; G11C 16/28; G11C 2013/0054; G11C 11/5642; G11C 13/0028; G11C 29/021; G11C 7/14; G11C 11/1677; G11C 11/16; G11C 13/0038; G11C 13/0064; G11C 2013/0045; G11C 2207/2254; G11C 7/04; G11C 11/15; G11C 11/4099; G11C 16/0483; G11C 16/08; G11C 16/10; G11C 16/3418; G11C 16/3431; G11C 16/349; G11C 29/44; G11C 7/062; G11C 11/1657; G11C 13/003; G11C 16/32; G11C 29/42; G11C 7/1051; G11C 11/1655; G11C 11/4091; G11C 11/4094; G11C 11/5628; G11C 13/0033; G11C 16/24; G11C 16/30; G11C 16/3404; G11C 2013/0057; G11C 2013/0078; G11C 2013/0092; G11C 2211/5621; G11C 2213/77; G11C 5/147; G11C 8/08; G11C 11/1693; G11C 13/0004; G11C 13/0061; G11C 2211/5644; G11C 2213/79; G11C 2213/82; G11C 29/02; G11C 29/08; G11C 29/40; G11C 29/52
USPC .............. 365/148, 100, 207, 189.07, 189.09, 365/189.02, 226, 158, 171, 189.011, 205
See application file for complete search history.

(56) References Cited

U.S. PATENT DOCUMENTS

| | | |
|---|---|---|
| 2022/0020419 A1 | 1/2022 | Wu |
| 2022/0028434 A1 | 1/2022 | Choi |
| 2022/0050621 A1 | 2/2022 | Park |
| 2022/0068356 A1 | 3/2022 | Shin |

FOREIGN PATENT DOCUMENTS

| | | |
|---|---|---|
| CN | 112951286 A | 6/2021 |
| CN | 114078557 A | 2/2022 |
| CN | 114121062 A | 3/2022 |

* cited by examiner

CIRCUIT FOR RECEIVING DATA AND MEMORY

CROSS-REFERENCE TO RELATED APPLICATIONS

This is a continuation of International Patent Application No. PCT/CN2022/123902 filed on Oct. 8, 2022, which claims priority to Chinese Patent Application No. 202210998008.6 filed on Aug. 19, 2022. The disclosures of the above-referenced applications are hereby incorporated by reference in their entirety.

BACKGROUND

The semiconductor device receives data through a circuit, for receiving data, included in the semiconductor device. The circuit for receiving data determines a logic level of the received data signal by using a reference voltage. For the circuit for receiving data, some influence on the level state of the subsequent data signal will be generated by the level state of the preceding data signal, so it is necessary to use the decision feedback equalization principle to eliminate the adverse influence from the preceding data signal and avoid the misjudgment for the data signal. However, the process of decision feedback equalization costs a lot of time, which affects the performance of the circuit for receiving data.

SUMMARY OF THE INVENTION

The present disclosure relates to the field of semiconductor memory technology, in particular to a circuit for receiving data and a memory. The present disclosure provides a circuit for receiving data and a memory, which can not only ensure the correctness of data reception, but also reduce the signal feedback time.

The technical solutions of the present disclosure are implemented as follows.

In a first aspect, an embodiment of the present disclosure provides a circuit for receiving data. The circuit for receiving data includes a voltage generating circuit, a data circuit and a selection circuit. The voltage generating circuit is configured to output, in a first mode, a first reference voltage signal and a second reference voltage signal. A voltage value of the first reference voltage signal is different from a voltage value of the second reference voltage signal.

The data circuit is configured to receive a data signal, the first reference voltage signal, and the second reference voltage signal, compare the data signal with the first reference voltage signal, output a first target signal, compare the data signal with the second reference voltage signal, and output a second target signal. The data signal is one of a plurality of data signals arranged in series.

The selection circuit is configured to receive the first target signal and the second target signal and determine one of the first target signal and the second target signal as a target data signal based on a level state of a previous data signal of the data signal.

In a second aspect, an embodiment of the present disclosure provides a memory including at least a circuit for receiving data as described in the first aspect.

DETAILED DESCRIPTION

Figure 1:
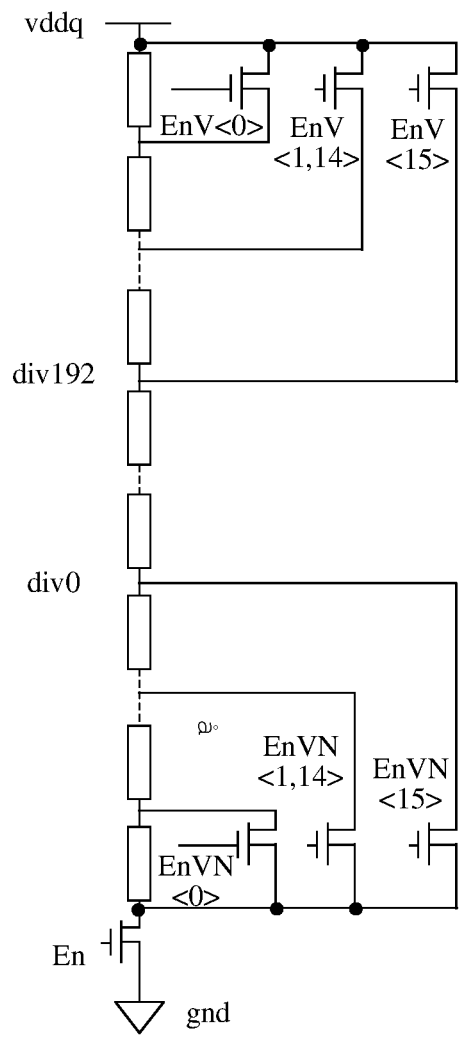
FIG. 1 is a schematic diagram of a structure of a resistance chain.

An embodiment of the present disclosure provides a circuit for receiving data. The circuit for receiving data includes a voltage generating circuit, a data circuit and a selection circuit. The voltage generating circuit is configured to output, in a first mode, a first reference voltage signal and a second reference voltage signal. A voltage value of the first reference voltage signal is different from a voltage value of the second reference voltage signal. The data circuit is configured to receive a data signal, the first reference voltage signal, and the second reference voltage signal, compare the data signal with the first reference voltage signal, output a first target signal, compare the data signal with the second reference voltage signal, and output a second target signal. The data signal is one of a plurality of data signals arranged in series. The selection circuit is configured to receive the first target signal and the second target signal and determine one of the first target signal and the second target signal as a target data signal based on a level state of a previous data signal of the data signal.

In some embodiments, the voltage generating circuit is further configured to output, in a second mode, a third reference voltage signal. A voltage value of the third reference voltage signal is between the voltage value of the first reference voltage signal and the voltage value of the second reference voltage signal. The data circuit is further configured to receive the third reference voltage signal, compare the data signal with the third reference voltage signal, and output a target data signal.

In some embodiments, the voltage generating circuit includes a first voltage generating circuit, a second voltage generating circuit, a first selector and a second selector. The first voltage generating circuit is configured to receive a first control signal group, and output, in the first mode, a first weak voltage signal and a second weak voltage signal based on the first control signal group. The second voltage generating circuit is configured to receive a second control signal group, and output, in the first mode, a first strong voltage signal and a second strong voltage signal based on the second control signal group. The first selector is configured to receive an intensity selection signal, the first weak voltage signal, and the first strong voltage signal, output the first strong voltage signal as the first reference voltage signal when the intensity selection signal is in a first state, or output the first weak voltage signal as the first reference voltage signal when the intensity selection signal is in a second state. The second selector is configured to receive the intensity selection signal, the second weak voltage signal and the second strong voltage signal, and output the second strong voltage signal as the second reference voltage signal when the intensity selection signal is in the first state, or output the second weak voltage signal as the second reference voltage signal when the intensity selection signal is in the second state. A driving strength of the first strong voltage signal is greater than a driving strength of the first weak voltage signal, and a driving strength of the second strong voltage signal is greater than a driving strength of the second weak voltage signal.

In some embodiments, the voltage generating circuit further includes a first encoding generator and a second encoding generator. The first encoding generator is configured to generate the first control signal group. The second encoding generator is configured to generate the second control signal group. In the first mode, a voltage difference between the first weak voltage signal and the second weak voltage signal is a first value, and the first value is determined by the first control signal group. A voltage difference between the first strong voltage signal and the second strong voltage signal is a second value, and the second value is determined by the second control signal group. The first value is the same as the second value.

In some embodiments, the voltage generating circuit further includes a calibration circuit. The calibration circuit is configured to receive, in a first mode, the first strong voltage signal and the first weak voltage signal, compare a voltage value of the first strong voltage signal with a voltage value of the first weak voltage signal, and output a first comparison signal. The first encoding generator is further configured to receive, in the first mode, the first comparison signal, and adjust the voltage value of the first weak voltage signal step by step by adjusting the first control signal group based on the first comparison signal, so as to cause that the voltage value of the first strong voltage signal is same as the voltage value of the first weak voltage signal, and a voltage value of the second strong voltage signal is same as a voltage value of the second weak voltage signal.

In some embodiments, the first voltage generating circuit is further configured to output, in the second mode, a third weak voltage signal based on the first control signal group. The second voltage generating circuit is further configured to output, in the second mode, a third strong voltage signal based on the second control signal group. The first selector is further configured to receive the intensity selection signal, the third weak voltage signal and the third strong voltage signal, and output the third strong voltage signal as the third reference voltage signal when the intensity selection signal is in the first state, or output the third weak voltage signal as the third reference voltage signal when the intensity selection signal is in the second state. A driving strength of the third strong voltage signal is greater than a driving strength of the third weak voltage signal.

In some embodiments, the calibration circuit is further configured to receive the third strong voltage signal and the third weak voltage signal, compare a voltage value of the third strong voltage signal with a voltage value of the third weak voltage signal, and output a second comparison signal. The first encoding generator is further configured to receive the second comparison signal, and adjust the voltage value of the third weak voltage signal step by step by adjusting the first control signal group based on the second comparison signal, so as to cause that the voltage value of the third strong voltage signal is same as the voltage value of the third weak voltage signal.

In some embodiments, the first voltage generating circuit includes a first voltage division adjustment circuit, and the first voltage division adjustment circuit includes a first main resistance chain and a first auxiliary resistance chain. In the first mode, the first main resistance chain and the first auxiliary resistance chain are connected through a first connection point and a second connection point, and the first connection point is connected in series between the second connection point and a ground terminal of the first main resistance chain. The first voltage division adjustment circuit is configured to adjust, based on the first control signal group, a resistance value distribution state of the first main resistance chain to output the first weak voltage signal through the first connection point, and adjust, based on the first control signal group, a resistance value distribution state of the first auxiliary resistance chain to output the second weak voltage signal through the second connection point.

In some embodiments, in the second mode, the first main resistance chain and the first auxiliary resistance chain are in an isolated state. The first voltage division adjustment circuit is further configured to adjust, based on the first control signal group, the resistance value distribution state of the first main resistance chain to output the third weak voltage signal through a voltage output node of the first main resistance chain.

In some embodiments, the first main resistance chain includes a plurality of first resistors arranged in series. One terminal of a first one of the first resistors is connected to a first power supply terminal. The other terminal of a last one of the first resistors is connected to a ground terminal. The first main resistance chain further includes A number of first switch transistors close to the first power supply terminal and A number of first switch transistors close to the ground terminal. First terminals of the A number of first switch transistors close to the first power supply terminal are all connected to the first power supply terminal, and first terminals of the A number of first switch transistors close to the ground terminal are all connected to the ground terminal. A number of first resistors close to the first power supply terminal and A number of first resistors close to the ground terminal are marked as first edge resistors. In a direction close to the first power supply terminal, an ath first switch transistor is configured to short circuit a number of first edge resistors. In a direction away from the first power supply terminal, an ath first switch transistor is configured to short circuit a number of first edge resistors. Both a and A are positive integers, a is less than or equal to A, and A is less than half of total number of the first resistors. In a part of the first main resistance chain which does not contain the first edge resistances, a voltage output node is led out every C number of first resistors. The first voltage generating circuit further includes a first selection output circuit. An input terminal of the first selection output circuit is connected to all voltage output nodes. The first selection output circuit is configured to control conduction or turnoff of the first switch transistors based on the first control signal group. In the second mode, the first selection output circuit is further configured to selects one of the voltage output nodes based on the first control signal group to output a preset third weak voltage signal.

In some embodiments, in the first main resistance chain, a second switch transistor is connected in series between two first resistors corresponding to each voltage output node. The first auxiliary resistance chain includes N×B number of second resistors connected in series. The first auxiliary resistance chain further includes B number of third switch transistors. One terminal of each of the B number of third switch transistors is connected to a same terminal of the first auxiliary resistance chain, the bth third switch transistor is configured to short circuit N×b number of second resistors, N, B and b are all positive integers, b is less than or equal to B, and N is not equal to C. The first voltage generating circuit further includes a second selection output circuit. The second selection output circuit is configured to control conduction or turnoff of the second switch transistors and the third switch transistors based on the first control signal group. In the first mode, the second selection output circuit is specifically configured to control any one of the second switch transistors to be turned off, so as to cause that the first auxiliary resistance chain, instead of one of the second resistors, is connected in series to the first main resistance chain, and form the first connection point and the second connection point, and output a preset first weak voltage signal through the first connection point, and output a preset second weak voltage signal through the second connection point.

In some embodiments, the first voltage division adjustment circuit further includes a first constant current power supply and a first constant voltage power supply. The first voltage division adjustment circuit is configured to determine, in the first mode, the first constant current power supply as the first power supply terminal, or determine, in the second mode, the first constant voltage power supply as the first power supply terminal.

In some embodiments, the second voltage generating circuit includes a second voltage division adjustment circuit, a first operational amplifier and a second operational amplifier. The second voltage division adjustment circuit includes a second main resistance chain and a second auxiliary resistance chain. In the first mode, the second main resistance chain and the second auxiliary resistance chain are connected through a third connection point and a fourth connection point, and the third connection point is connected in series between the fourth connection point and a ground terminal of the second main resistance chain. The second voltage division adjustment circuit is configured to adjust, based on the second control signal group, a resistance value distribution state of the second main resistance chain to output a first voltage signal through the third connection point, and adjust, based on the second control signal group, a resistance value distribution state of the second auxiliary resistance chain to output a second voltage signal through the fourth connection point. The first operational amplifier is configured to receive the first voltage signal, amplify the first voltage signal and output the first strong voltage signal. The second operational amplifier is configured to receive the second voltage signal, amplify the second voltage signal and output the second strong voltage signal.

In some embodiments, in the second mode, the second main resistance chain and the second auxiliary resistance chain are in an isolated state. The second voltage division adjustment circuit is further configured to adjust, based on the second control signal group, the resistance value distribution state of the second main resistance chain to output a third voltage signal through a voltage output node of the second main resistance chain. The first operational amplifier is configured to receive the third voltage signal, amplify the third voltage signal and output the third strong voltage signal.

The selection circuit is configured to receive the first target signal and the second target signal and determine one of the first target signal and the second target signal as a target data signal based on a level state of a previous data signal of the data signal.

The embodiments of the present disclosure provide a circuit for receiving data and a memory. Two reference voltage signals with different voltage values can be generated by a voltage generating circuit. It is only needed to select the appropriate judgment result, while the real-time feedback adjustment for the reference voltage signal based on the level state of the previous data signal is not necessary. Therefore, not only the correctness of data reception is ensured, but also the signal feedback time is reduced.

The technical solutions in the embodiments of the present disclosure will be clearly and completely described below in combination with the drawings in the embodiments of the present disclosure. It should be understood that the specific embodiments described herein are intended only to explain the relevant application and not to limit the present disclosure. In addition, it should be noted that for ease of description, only portions related to the present disclosure are shown in the drawings. Unless otherwise defined, all technical and scientific terms used herein have the same meanings as are commonly understood by those skilled in the art of the present disclosure. The terms used herein are for the purpose of describing embodiments of the present disclosure only and is not intended to limit the present disclosure. In the following description, reference is made to "some embodiments" that describe a subset of all possible embodiments, but it is understood that "some embodiments" may be the same subset or different subsets of all possible embodiments and may be combined with each other without conflict. It should be noted that the term "first second third" referred to in the embodiments of the present disclosure is used only to distinguish similar objects and does not represent a particular ordering of objects, and it should be understood that the "first second third" may be interchanged in a particular order or priority order where permissible to enable the embodiments of the present disclosure described herein to be implemented in an order other than that illustrated or described herein.

Some terms used in the present disclosure are illustrated below: Dynamic Random Access Memory (DRAM), Synchronous Dynamic Random Access Memory (SDRAM), Double Data Rate SDRAM (DDR), DDR5 Specification (DDR5), Low Power DDR (LPDDR), LPDDR5 Specification (LPDDR5), Decision Feedback Equalizer (DFE).

At present, a circuit for receiving data (DQ RX) of a semiconductor device needs to determine the logic level of a received data signal according to a reference voltage. At this time, the level state of the preceding data signal will have some influence on the level state of the subsequent data signal. Therefore, the feedback adjustment (used for judging the current data signal) for the magnitude of the reference voltage can be performed according to the level state of the previous data signal (or the level states of the previous plurality of data signals), thereby compensating for the influence of the previous data signal on the level state of the current data signal.

Figure 2:
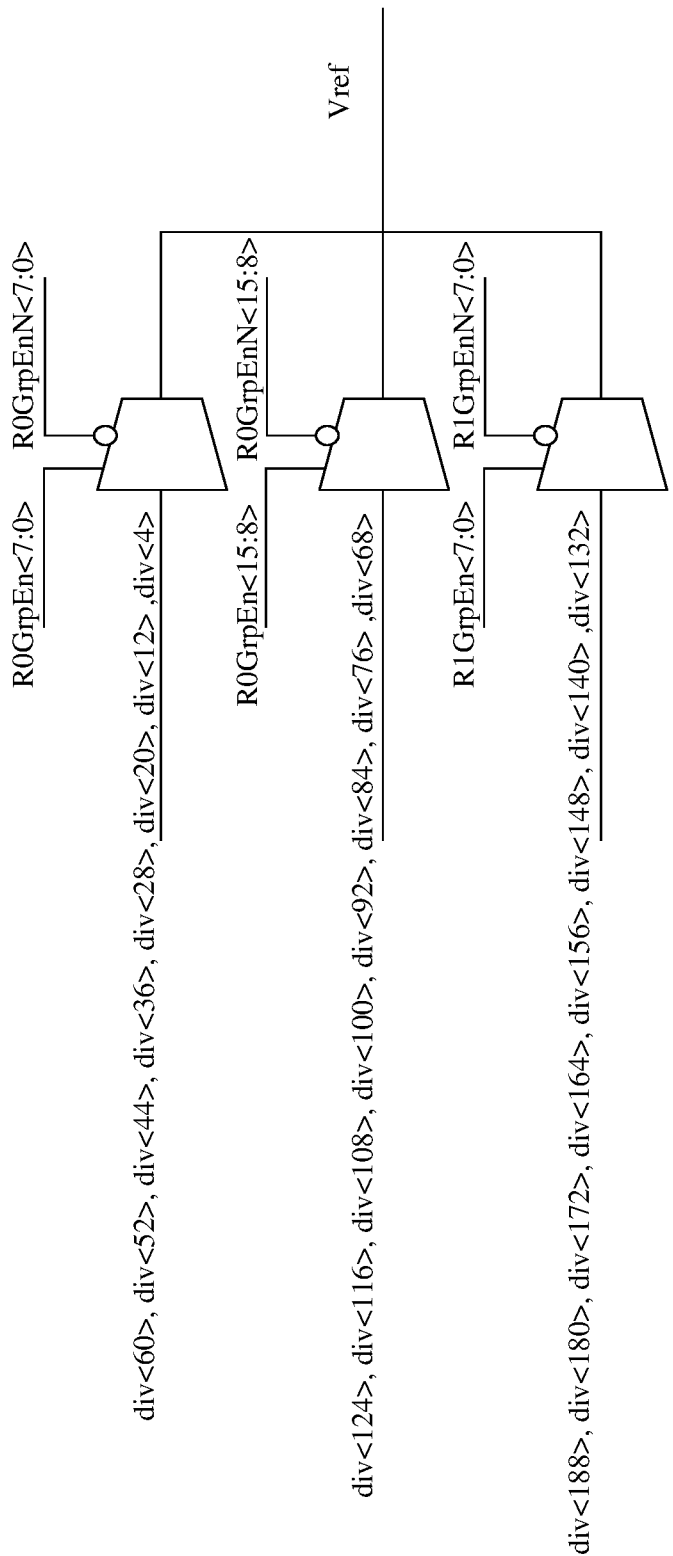
FIG. 2 is a schematic diagram of a structure of a selection output circuit.

The circuit for receiving data may generate a reference voltage through a resistance chain and a selection output circuit. FIG. 1 shows a schematic diagram of a structure of a resistance chain. FIG. 2 shows a schematic diagram of a structure of a selection output circuit. As shown in FIG. 1, the resistance chain includes a plurality of resistors connected in series and an enable switch transistor. The first resistor is connected to the power supply signal vddq and the last resistor is connected to the ground signal gnd. The control terminal of the enable switch transistor is configured to receive the enable signal En to control whether the resistance chain operates or not. In addition, the resistance chain further includes 32 control switch transistors. The first one of the control switch transistors is configured to short circuit one resistor close to the power supply signal vddq, the second one of the control switch transistors is configured to short circuit two resistors close to the power supply signal vddq . . . the 16th one of the control switch transistors is configured to short circuit 16 resistors close to the power supply signal vddq, and the control terminals thereof receive the first signals EnV<0>~EnV<15> respectively. The last one of the control switch transistors is configured to short circuit one resistor close to the ground signal gnd, the second to last one of the control switch transistors is configured to short circuit two resistors close to the ground signal gnd . . . the 16th to last one of the control switch transistors is configured to short circuit 16 resistors close to the ground signal gnd, and the control terminals thereof receive inverted signals of the first signal EnVN<0>~EnVN<15> respectively. In the middle part of the resistance chain, the nodes between adjacent resistors are named as div0, div1 . . . div192 respectively. The div4, div12, div20 . . . div188 are led out as voltage output nodes. That is, one voltage output node is generated every eight nodes stating from div4. As shown in FIG. 2, the selection output circuit selects one voltage output node to output the reference voltage signal Vref according to the second signals R0GrpEn <15: 0> and its inverted signals R0GrpEnN <15: 0>, and the third signals R1GrpEn <7: 0> and its inverted signals R1GrpEnN <7:0>, which can implement the programmable change of the voltage value of the reference voltage signal. Here, only one of R0GrpEn <15: 0> and R1GrpEn <7: 0> is in the specified state (high level or low level) to select the corresponding voltage output node. In some embodiments, the voltage difference across each resistor may be set to 2.5 millivolts (mv) under a preset current, so the voltage value of the reference voltage signal led out from div4 to div188 may be 10 to 490 mV.

That is, in the circuit for receiving data, the feedback adjustment for the operation state of the resistance chain is needed to be performed according to the level state of the previous data signal, and an appropriate voltage output node is selected to output the reference voltage signal Vref. However, since the above feedback adjustment process needs to cost a certain time, the improvement of speed of the memory is affected.

Embodiments of the present disclosure will be described in detail below with reference to the drawings.

Figure 3:
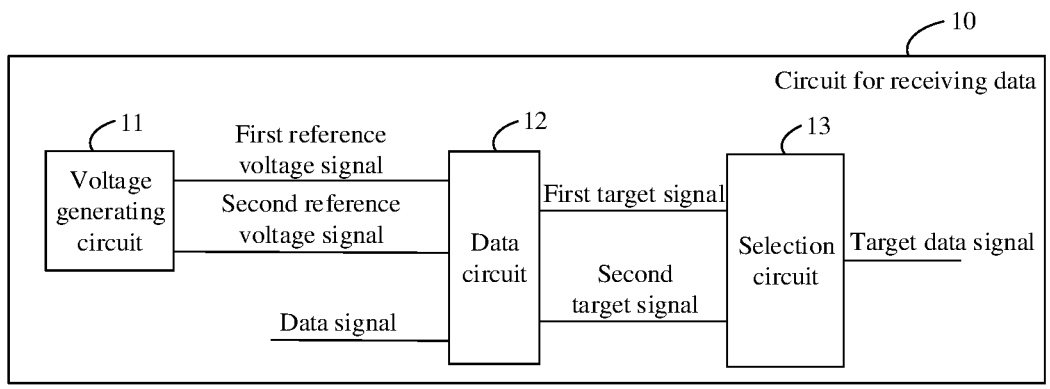
FIG. 3 is a schematic diagram of a structure of a circuit for receiving data provided by an embodiment of the present disclosure.

In an embodiment of the present disclosure, referring to FIG. 3, a schematic diagram of a structure of a circuit for receiving data 10 provided by the embodiment of the present disclosure is shown. As shown in FIG. 3, the circuit for receiving data 10 includes a voltage generating circuit 11, a data circuit 12 and a selection circuit 13.

The voltage generating circuit 11 is configured to output, in a first mode, a first reference voltage signal and a second reference voltage signal. A voltage value of the first reference voltage signal is different from a voltage value of the second reference voltage signal.

The data circuit 12 is configured to receive a data signal, the first reference voltage signal, and the second reference voltage signal, compare the data signal with the first reference voltage signal, output a first target signal, compare the data signal with the second reference voltage signal, and output a second target signal. The data signal is one of a plurality of data signals arranged in series.

The selection circuit 13 is configured to receive the first target signal and the second target signal and determine one of the first target signal and the second target signal as a target data signal based on a level state of a previous data signal of the data signal.

It should be noted that the circuit for receiving data 10 of the embodiments of the present disclosure may be applied to but is not limited to a memory, such as a DRAM, a SDRAM, a DDR and the like. In addition, in other analog circuits/digital circuits, the signal reception function can be implemented by the circuit for receiving data 10 provided by the embodiments of the present disclosure.

In the embodiment of the present disclosure, the voltage value of the first reference voltage signal being less than the voltage value of the second reference voltage signal is taken as an example for the subsequent explanation. In the first mode, if the previous data signal is at a low level, the target data signal is generated according to a comparison result of the current data signal and the first reference voltage signal. If the previous data signal is at a high level, the target data signal is generated according to a comparison result of the current data signal and the second reference voltage signal. In this way, two reference voltage signals with different voltage values can be simultaneously generated by the voltage generating circuit 11. The real-time feedback adjustment for the reference voltage signal according to the level state of the previous data signal is not necessary, while only a appropriate one of the first target signal and the second target signal needs to be selected according to the level state of the previous data signal to generate the target data signal. Therefore, not only the correctness of data reception is ensured, but also the signal feedback time is reduced, and it is beneficial to further improving the speed of the memory.

Figure 4:
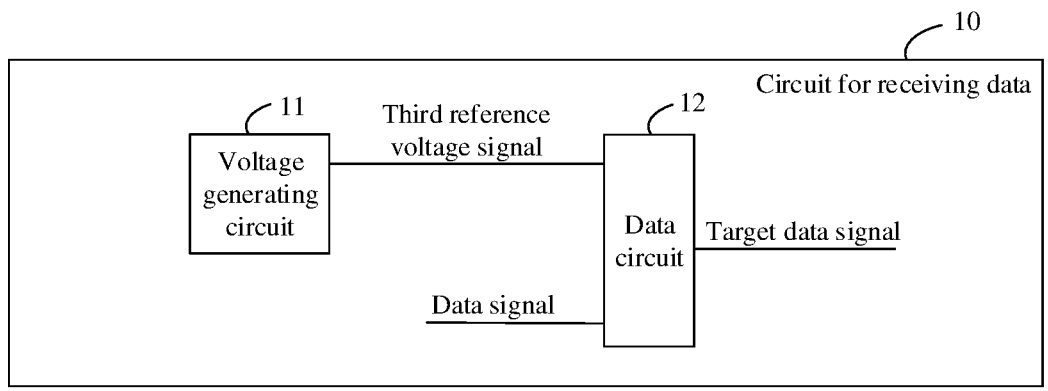
FIG. 4 is a schematic diagram of a structure of another circuit for receiving data provided by an embodiment of the present disclosure.

In some embodiments, as shown in FIG. 4, the voltage generating circuit 11 is further configured to output, in a second mode, a third reference voltage signal. A voltage value of the third reference voltage signal is between the voltage value of the first reference voltage signal and the voltage value of the second reference voltage signal.

The data circuit 12 is further configured to receive the third reference voltage signal, compare the data signal with the third reference voltage signal, and output a target data signal.

It should be noted that in the second mode, the voltage generating circuit 11 generates only one third reference voltage signal, and then the voltage value of the third reference voltage signal is adjusted based on the level state of the previous data signal (the previous data bit) to compensate the influence of the previous data signal on the current data signal, which is used to judge the logic level of the current data signal.

Figure 5:
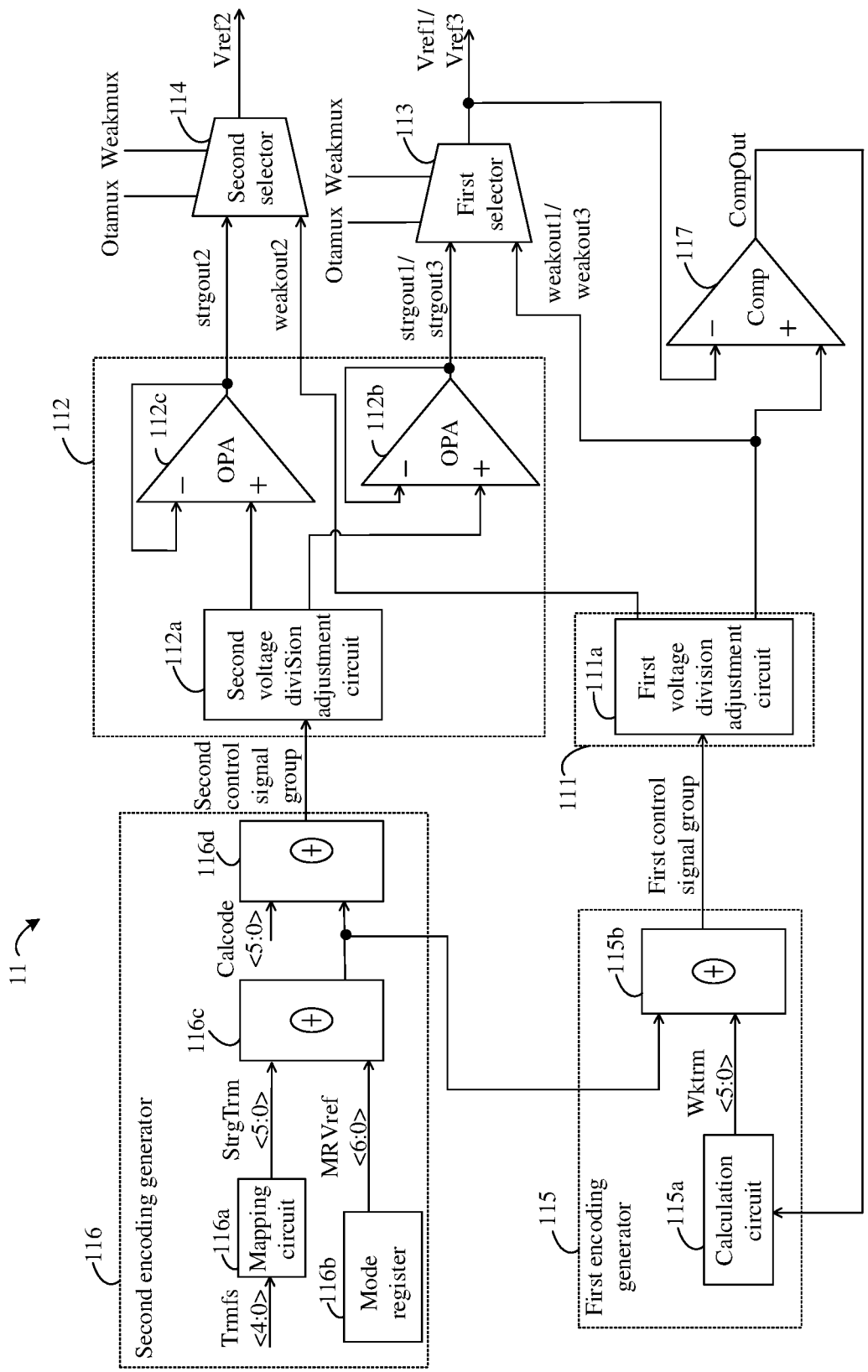
FIG. 5 is a schematic diagram of a specific structure of a circuit for receiving data provided by an embodiment of the present disclosure.

In some embodiments, as shown in FIG. 5, the voltage generating circuit 11 includes a first voltage generating circuit 111, a second voltage generating circuit 112, a first selector 113 and a second selector 114.

The first voltage generating circuit 111 is configured to receive a first control signal group, and output, in the first mode, a first weak voltage signal weakout1 and a second weak voltage signal weakout2 based on the first control signal group.

The second voltage generating circuit 112 is configured to receive a second control signal group, and output, in the first mode, a first strong voltage signal strgout1 and a second strong voltage signal strgout2 based on the second control signal group.

The first selector 113 is configured to receive an intensity selection signal, the first weak voltage signal weakout1, and the first strong voltage signal strgout1, output the first strong voltage signal strgout1 as the first reference voltage signal Vref1 when the intensity selection signal is in a first state, or output the first weak voltage signal weakout1 as the first reference voltage signal Vref1 when the intensity selection signal is in a second state.

The second selector 114 is configured to receive the intensity selection signal, the second weak voltage signal weakout2 and the second strong voltage signal strgout2, and output the second strong voltage signal strgout2 as the second reference voltage signal Vref2 when the intensity selection signal is in the first state, or output the second weak voltage signal weakout2 as the second reference voltage signal Vref2 when the intensity selection signal is in the second state.

Herein, a driving strength of the first strong voltage signal strgout1 is greater than a driving strength of the first weak voltage signal weakout1, and a driving strength of the second strong voltage signal strgout2 is greater than a driving strength of the second weak voltage signal weakout2.

It should be noted that when the circuit for receiving data 10 starts to operate, the first strong voltage signal strgout1/second strong voltage signal strgout2 having a higher driving strength is required as the first reference voltage signal Vref1/second reference voltage signal Vref2, and when the circuit for receiving data 10 tends to be stable, the first weak voltage signal wakout1/second weak voltage signal wakout2 having a low driving strength can be used as the first reference voltage signal Vref1/second reference voltage signal Vref2, thereby achieving an effect of saving power.

As an example, as shown in FIG. 5, the intensity selection signal may include a pair of inverted signals Otamux and Weakmux. The intensity selection signal being in the first state represents that Otamux is at a high level and Weakmux is at a low level. The intensity selection signal being in the second state represents that Otamux is at a low level and Weakmux is at a high level. Of course, in other embodiments, the selection signal for weak voltage signal or strong voltage may include only one signal.

In some embodiments, as shown in FIG. 5, the voltage generating circuit 11 further includes a first encoding generator 115 and a second encoding generator 116.

The first encoding generator 115 is configured to generate the first control signal group.

The second encoding generator 116 is configured to generate the second control signal group.

In the first mode, a voltage difference between the first weak voltage signal weakout1 and the second weak voltage signal weakout2 is a first value, and the first value is determined by the first control signal group. A voltage difference between the first strong voltage signal strgout1 and the second strong voltage signal strgout2 is a second value, and the second value is determined by the second control signal group. Specifically, the first value is the same as the second value. That is, "the voltage difference between the first strong voltage signal strgout1 and the second strong voltage signal strgout2" is always equal to "the voltage difference between the first weak voltage signal wakout1 and the second weak voltage signal wakout2".

It should be noted that the internal structures of the first encoding generator 115 and the second encoding generator 116 are needed to be designed according to the actual application scenario, which are not the focus of the embodiment of the present disclosure and does not affect the understanding of the embodiment of the present disclosure. Thus, only a brief description will be made with FIG. 5 as an example. The second encoding generator 116 includes a mapping circuit 116a, a mode register 116b and an adder 116c and an adder 116d. The mapping circuit 116a is configured to generate StrgTrm<5:0> based on Trmfs<4:0>. The mode register 116b is configured to output MRVref <6:0>. The adder 116c is configured to add the StrgTrm<5:0> and MRVref <6:0>. The adder 116d is configured to add the output result of the adder 116c and Calcode <5:0> to obtain the second control signal group. The first encoding generator 115 includes a calculation circuit 115a and an adder 115b. The calculation circuit 115a is configured to generate Wktrm<5:0>. The adder 115b is configured to add Wktrm<5:0> and the output result of the adder 116c to obtain the first control signal group. Thus, the sources of the first control signal group and the second control signal group are partly the same. That is, similar changes will be generated in the first control signal group and the second control signal group, which ensures that "the voltage difference between the first strong voltage signal strgout1 and the second strong voltage signal strgout2" is equal to "the voltage difference between the first weak voltage signal wakout1 and the second weak voltage signal wakout2".

In some embodiments, the voltage generating circuit 11 further includes a calibration circuit 117.

The calibration circuit 117 is configured to receive, in a first mode, the first strong voltage signal strgout1 and the first weak voltage signal weakout1, compare a voltage value of the first strong voltage signal strgout1 with a voltage value of the first weak voltage signal weakout1, and output a first comparison signal.

The first encoding generator 115 is further configured to receive, in the first mode, the first comparison signal, and adjust the voltage value of the first weak voltage signal weakout1 step by step by adjusting the first control signal group based on the first comparison signal, to cause the voltage value of the first strong voltage signal strgout1 to be same as the voltage value of the first weak voltage signal weakout1, and the voltage value of the first strong voltage signal strgout1 to be the same as a voltage value of the second weak voltage signal weakout2.

In other words, the voltage of the first strong voltage signal strgout1 being same as the voltage of the first weak voltage signal wakout1 can be directly achieved by the calibration circuit 117. The voltage value of the second strong voltage signal strgout2 is also same as the voltage of the second weak voltage signal wakout2 since the above "the voltage difference between the first strong voltage signal strgout1 and the second strong voltage signal strgout2" is equal to "the voltage difference between the first weak voltage signal wakout1 and the second weak voltage signal wakout2".

In some embodiments, as shown in FIG. 5, the first voltage generating circuit 111 is further configured to output, in the second mode, a third weak voltage signal weakout3 based on the first control signal group.

The second voltage generating circuit 112 is further configured to output, in the second mode, a third strong voltage signal strgout3 based on the second control signal group.

The first selector 113 is further configured to receive the intensity selection signal, the third strong voltage signal strgout3 and the third weak voltage signal weakout3, and output the third strong voltage signal strgout3 as the third reference voltage signal Vref3 when the intensity selection signal is in the first state, or output the third weak voltage signal weakout3 as the third reference voltage signal Vref3 when the intensity selection signal is in the second state. A driving strength of the third strong voltage signal strgout3 is greater than a driving strength of the third weak voltage signal weakout3.

It should be noted that for the first voltage generating circuit 111, the first weak voltage signal wakout1 and the third weak voltage signal wakout3 may share the same signal path. For the second voltage generating circuit 112, the first strong voltage signal strgout1 and the third strong voltage signal strgout3 may share the same signal path, thereby reducing the number of signal paths and reducing the control cost. Accordingly, in the first mode, the second selector 114 selects from the first strong voltage signal strgout1 and the first weak voltage signal wakout1 based on the intensity selection signal. In the second mode, the second selector 114 selects from the third strong voltage signal strgout3 and the third weak voltage signal wakout3 based on the intensity selection signal.

Similarly, in some embodiments, the calibration circuit 117 is further configured to receive the third strong voltage signal strgout3 and the third weak voltage signal wakout3, compare a voltage value of the third strong voltage signal strgout3 with a voltage value of the third weak voltage signal weakout3, and output a second comparison signal.

The first encoding generator 115 is further configured to receive the second comparison signal, and adjust the voltage value of the third weak voltage signal weakout3 step by step by adjusting the first control signal group based on the second comparison signal, to cause the voltage value of the third strong voltage signal strgout3 to be same as the voltage value of the third weak voltage signal weakout3.

Figure 6A:
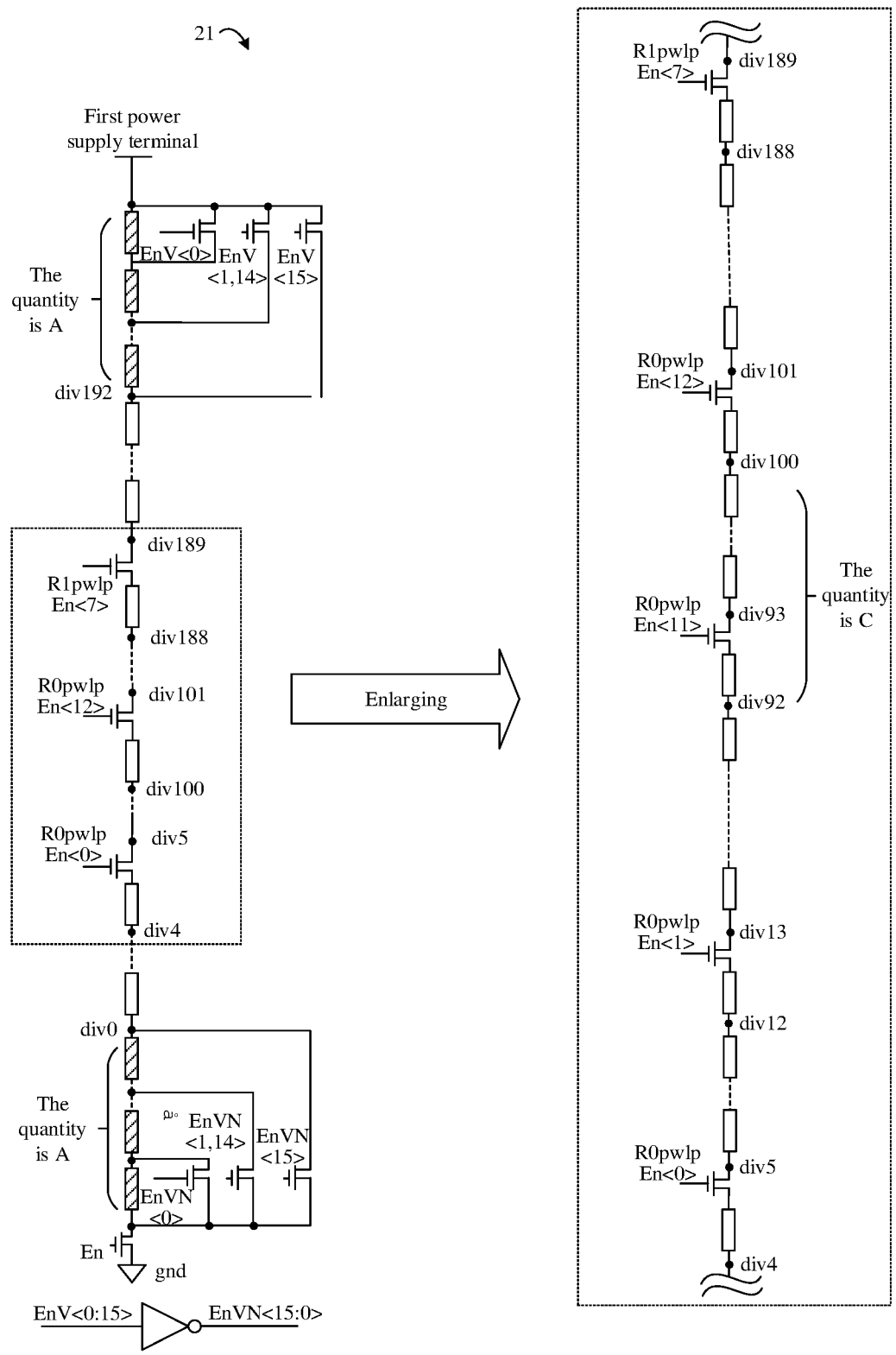
FIG. 6A is a first schematic diagram of a partial structure of the first voltage division adjustment circuit provided by an embodiment of the present disclosure.
Figure 6B:
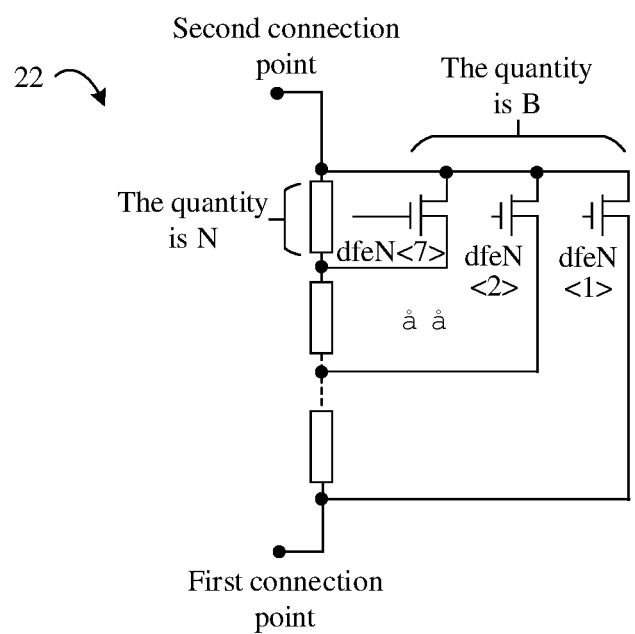
FIG. 6B is a second schematic diagram of a partial structure of the first voltage division adjustment circuit provided by an embodiment of the present disclosure.

In some embodiments, as shown in FIG. 5, the first voltage generating circuit 111 includes a first voltage division adjustment circuit 111a, and the first voltage division adjustment circuit 111a includes a first main resistance chain 21 and a first auxiliary resistance chain 22, see more specifically FIG. 6A and FIG. 6B.

First, in the first mode, the first main resistance chain 21 and the first auxiliary resistance chain 22 are connected through a first connection point and a second connection point, and the first connection point is connected in series between the second connection point and a ground terminal of the first main resistance chain 21. In other words, in the first mode, the first auxiliary resistance chain 22 is connected in series in the first main resistance chain 21. The first connection point refers to the "connection point between the first auxiliary resistance chain 22 and the first main resistance chain 21" close to the ground terminal. The second connection point refers to the "connection point between the first auxiliary resistance chain 22 and the first main resistance chain 21" close to the power supply terminal. Accordingly, the first voltage division adjustment circuit 111a is configured to adjust, based on the first control signal group, a resistance value distribution state of the first main resistance chain 21 to output the first weak voltage signal through the first connection point, and adjust, based on the first control signal group, a resistance value distribution state of the first auxiliary resistance chain 22 to output the second weak voltage signal through the second connection point.

Secondly, in the second mode, the first main resistance chain 21 and the first auxiliary resistance chain 22 are in an isolated state. That is, the first auxiliary resistance chain 22 is not connected to the first main resistance chain 21. Accordingly, the first voltage division adjustment circuit 111a is further configured to adjust, based on the first control signal group, the resistance value distribution state of the first main resistance chain 21 to output the third weak voltage signal through a voltage output node of the first main resistance chain 21.

Thus, in the first mode, the first auxiliary resistance chain 22 is connected in series in the first main resistance chain 21, and the first connection point and the second connection point are formed. The first weak voltage signal wakout1 and the second weak voltage signal wakout2 are outputted respectively through the first connection point and the second connection point. In the second mode, the first auxiliary resistance chain 22 is not connected to the first main resistance chain 21. That is, the first auxiliary resistance chain 22 is not functioning, and the third weak voltage signal weakout3 is outputted through the voltage output node of the first main resistance chain 21.

Referring to FIG. 6A to FIG. 6E, the detailed circuit structure of the first main resistance chain 21 is described below.

As shown in FIG. 6A, the first main resistance chain 21 includes a plurality of first resistors (including resistors filled with shadow and resistors not filled with shadow in FIG. 6A) arranged in series. One terminal of the first one of the first resistors is connected to a first power supply terminal. The other terminal of the last one of the first resistors is connected to a ground terminal gnd. The first main resistance chain 21 further includes A number of first switch transistors close to the first power supply terminal and A number of first switch transistors close to the ground terminal. First terminals of the A number of first switch transistors close to the first power supply terminal are all connected to the first power supply terminal, and first terminals of the A number of first switch transistors close to the ground terminal are all connected to the ground terminal.

For convenience of illustration, A number of first resistors close to the first power supply terminal and A number of first resistors close to the ground terminal are marked as first edge resistors, i.e. resistors filled with shadow in FIG. 6A. In a direction close to the first power supply terminal, the ath first switch transistor is configured to short circuit a number of first edge resistors. In a direction away from the first power supply terminal, the ath first switch transistor is configured to short circuit a number of first edge resistors. Both a and A are positive integers, a is less than or equal to A, and A is less than half of the total number of the first resistors. In a part of the first main resistance chain 21 which does not contain the first edge resistors (i.e. the dashed box portion in FIG. 6A), a voltage output node is led out every C number of first resistors, such as div4, div12 . . . div92, div100 . . . div188 in FIG. 6A.

Taking A=16 and C=8 as examples, as shown in FIG. 6A, in the part close to the first power supply terminal, the first main resistance chain 21 is provided with 16 first edge resistors and 16 first switch transistors (whose control terminals receive the first signals EnV<15:0>). The first one of the first switch transistors is configured to short circuit the first edge resistor. The second one of the first switch transistors is configured to short circuit the first to second first edge resistors . . . the 16th first switch transistor is configured to short circuit the first to 16th first edge resistors. In the part close to the ground terminal, 16 first edge resistors and 16 first switch transistors (whose control terminals receive the inverted signals of the first signals EnVN<0:15> respectively) are provided, and the operation principle is similar. The first signals EnV<15:0> and the inverted signals of the first signals EnVN<15:0> are all from the first control signal group.

In the middle part of the first main resistance chain 21, i.e. the enlarged part in FIG. 6A, a voltage output node is led out every eight first resistors, i.e. div4, div12 . . . div188. In particular, as shown in FIG. 6A, every eight first resistors are actually connected in series with one second switch transistor (whose control terminal receives one of the fourth signals R0pwlpEn <15:0> and the fifth signals R1pwlpEn <7:0>). Since all second switch transistors are conducted in the second mode, the second switch transistors can be regarded as a wire temporarily.

The circuit control principle in the second mode is described in detail below.

In particular, the first voltage generating circuit 111 further includes a first selection output circuit. An input terminal of the first selection output circuit is connected to all voltage output nodes. The first selection output circuit is configured to control conduction or turnoff of the first switch transistors based on the first control signal group. In the second mode, the first selection output circuit is further configured to selects one voltage output node based on the first control signal group to output the preset third weak voltage signal weakout3.

It should be noted that in the second mode, the first power supply terminal is a constant voltage power supply. At this time, according to the desired voltage value, one voltage output node may be determined from different voltage output nodes div4, div12 . . . div188 by the first selection output circuit, thereby outputting a desired third voltage signal. Meanwhile, if the voltage at the div14 is required, the two first edge resistors close to the first power supply terminal may be short circuited by controlling the operation state of the first switch transistors, and the two first edge resistors far away from the ground terminal may be controlled to be connected additionally (i.e., the overall number of resistors in the first main resistance chain 21 is guaranteed to be unchanged), so that the voltage output node div12 is equivalent to the voltage output node div14, and the output of a specific voltage value is implemented.

In a specific embodiment, the resistance of the first edge resistor is R/2, and the resistance values of the first resistors other than the first edge resistor are R. Even number (e.g. 0, 2, 4 . . . 16) of the first edge resistors are short circuited each time during the operation process of the first main resistance chain 21. Taking the first power supply terminal as a constant voltage power supply and the voltage is 500 mV as an example, 200 equivalent resistors with resistance value R are fixedly connected to the first main resistance chain 21, and the voltage division of each equivalent resistor is 2.5 mV. Accordingly, since the third weak voltage signal weakout3 is led out from any one of div4 to div188, the voltage value of the third weak voltage signal weakout3 may be programmatically changed from 10 to 490 mV.

Figure 6C:
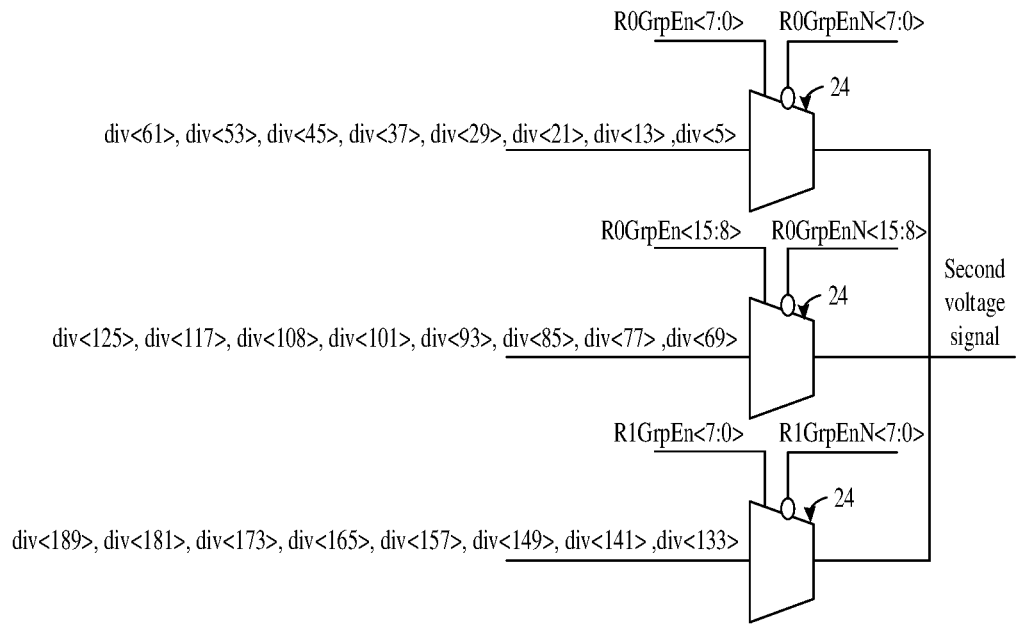
FIG. 6C is a third schematic diagram of a partial structure of the first voltage division adjustment circuit provided by an embodiment of the present disclosure.
Figure 6C:
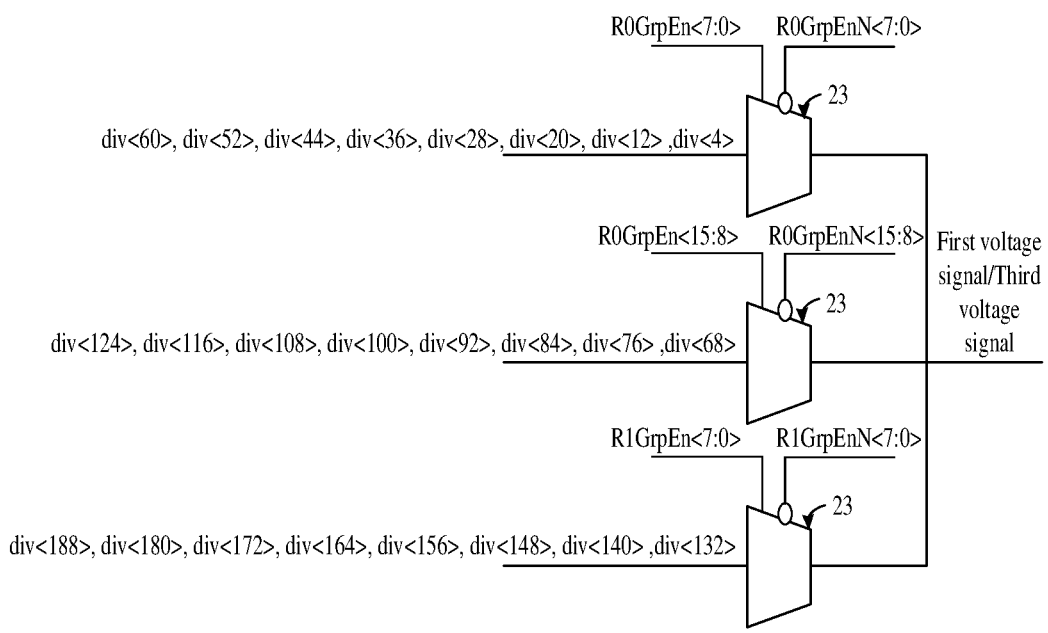

It should be understood that the first selection output circuit refers to the conceptual circuit for implementing the control function in the second mode, and its corresponding hardware circuit includes at least a plurality of first data selectors 23 and a plurality of second data selectors 24 as shown in FIG. 6C. The control terminals of the first data selectors 23 and the control terminals of the second data selectors 24 receive the same signals, i.e. the second signals R0GrpEn<15:0> and the third signals R1GrpEn<7:0>. Here, only one of R0GrpEn<15: 0> and R1GrpEn <7:0> is at a high level (it may also be at a low level in some scenarios), so that the first data selector 23 selects a corresponding voltage output node to output the third weak voltage signal. Here, the second signals R0GrpEn <15: 0> and the third signals R1GrpEn <7:0> all come from the first control signal group.

It should be illustrated that in the second mode, since the control signals of the first data selectors 23 and the second data selectors 24 are the same, the second data selectors 24 actually have output signals, but the output signals of the second data selector 24 are not used in the second mode, and the second data selector 24 may not be enabled to save energy consumption.

In some embodiments, as previously mentioned, one second switch transistor is connected in series between two first resistors corresponding to each voltage output node in the first main resistance chain 21. In addition, referring to FIG. 6B, the first auxiliary resistance chain 22 includes N×B number of second resistors connected in series. The first auxiliary resistance chain 22 further includes B number of third switch transistors. One terminal of each of the B number of third switch transistors is connected to the same terminal of the first auxiliary resistance chain 22, and the bth third switch transistor is configured to short circuit N×b number of second resistors, N, B and b are all positive integers, and b is less than or equal to B, and N is not equal to C.

Taking N=4 and B=7 as examples, as shown in FIG. 6B, the second auxiliary resistance chain includes 28 second resistors and 7 third switch transistors (whose control terminals receive the sixth signals dfeN <7:1>). The first third switch transistor may be configured to short circuit the first to fourth second resistors, the second third switch transistor may be configured to short circuit the first to eighth resistors . . . the seventh third switch may be configured to short circuit the first to 28th second resistors. The sixth signals dfeN <7:1> come from the first control signal group.

In particular, the first voltage generating circuit 111 further includes a second selection output circuit. The second selection output circuit is configured to control conduction or turnoff of the second switch transistors and the third switch transistors based on the first control signal group. In the first mode, the second selection output circuit is specifically configured to control any one of the second switch transistors to be turned off, to cause the first auxiliary resistance chain 22, instead of one of the first resistors, to be connected in series to the first main resistance chain 21, and form the first connection point and the second connection point, and output the preset first weak voltage signal through the first connection point, and output the preset second weak voltage signal through the second connection point.

That is, the physical connection wire exists between the first terminal of the first auxiliary resistance chain 22 and all the voltage output nodes (e.g. div4, div12 . . . ), and the physical connection wire exists between the second terminal of the first auxiliary resistance chain 22 and the next nodes of all the voltage output nodes (e.g. div5, div13 . . . ). It should be noted that when the second switch transistors are conducted, which is equal to that the first auxiliary resistance chain 22 is short circuited by the corresponding first resistors, the first auxiliary resistance chain 22 is not connected to the first main resistance chain 21. However, if one of the second switch transistors in the first main resistance chain 21

(e.g. the second switch transistor corresponding to R0pwlpEn<12>) is disconnected, then the first auxiliary resistance chain 22, instead of the corresponding second resistors, is connected in series between the node div101 and the node div100. The node div101 and the first terminal of the first auxiliary resistance chain 22 are connected to form the second connection point, and the node div100 and the second terminal of the first auxiliary resistance chain 22 are connected to form the first connection point. In other words, the first connection point in the first mode may be any one of the voltage output nodes in the second mode.

It should be noted that the first power supply terminal in the first mode is a constant current power supply. At this time, according to the desired voltage value, a second switch transistor (for example, a second switch transistor corresponding to R0pwlpEn <12>) in the first main resistance chain 21 is selected to be disconnected. At this time, the first auxiliary resistance chain 22 and the first main resistance chain 21 are connected in series to form a path, and the node 100 outputs the first weak voltage signal wakout1 as the first connection point, and the node div101 outputs the second weak voltage signal wakout2 as the second connection point. Meanwhile, with reference to the second weak voltage signal weakout2, since the current of the first main resistance chain 21 is constant (due to the use of a constant current power supply), the voltage division of each second resistor is fixed (for example, 2.5 mV), and the voltage difference between the first weak voltage signal and the second weak voltage signal can be programmatically changed from 10 to 70 mv by controlling the resistance distribution state of the first auxiliary resistance chain 22.

It should be understood that the second selection output circuit refers to the conceptual circuit for implementing the control function in the first mode, and similarly, its corresponding hardware circuit includes at least a plurality of first data selectors 23 and a plurality of second data selectors 24 as shown in FIG. 6C. At this time, the node selected by the first data selector 23 is the location of the first connection point, and the node selected by the second data selector 24 is the location of the second connection point, thereby outputting the first weak voltage signal wakout1 and the second weak voltage signal wakout2.

Further, as shown in FIG. 6A, a fourth switch transistor is connected in series to the first main resistance chain 21. The fourth switch transistor receives an enable signal En for controlling the operation of the first voltage division adjustment circuit 111a.

Figure 6D:
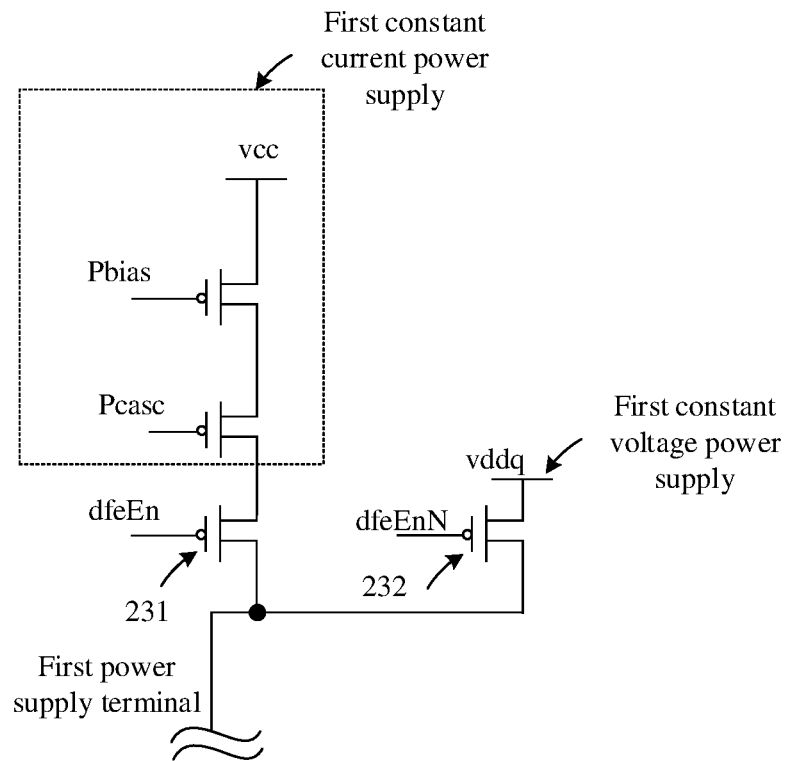
FIG. 6D is a fourth schematic diagram of a partial structure of the first voltage division adjustment circuit provided by an embodiment of the present disclosure.

In some embodiments, as shown in FIG. 6D, the first voltage division adjustment circuit 111a further includes a first constant current power supply and a first constant voltage power supply. The first voltage division adjustment circuit 11a is configured to determine, in the first mode, the first constant current power supply as the first power supply terminal, or determine, in the second mode, the first constant voltage power supply as the first power supply terminal.

Further, it should be illustrated that as shown in FIG. 6D, the first voltage division adjustment circuit 11a further includes a switch transistor 231 and a switch transistor 232, which are used for switching the power supply type according to the mode selection signal dfeEn and the inverted signal of the mode selection signal dfeEnN.

As an example, referring to FIG. 6D, the first constant current power supply may include two switch transistors. The control terminal of the first switch transistor receives the seventh signal Pbias, and the control terminal of the second transistor receives the eighth signal Pcasc. The second transistor mainly acts as a noise isolation function to avoid the output voltage of the first switch transistor occurring fluctuation due to the influence of the series circuit on the output voltage of the first switch transistor.

Figure 6E:
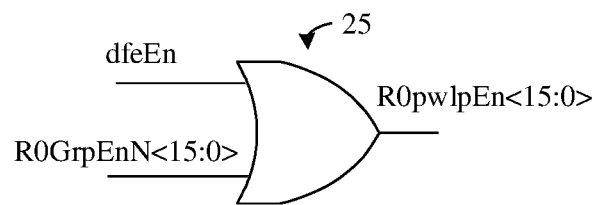
FIG. 6E is a fifth schematic diagram of a partial structure of the first voltage division adjustment circuit provided by an embodiment of the present disclosure.
Figure 6E:
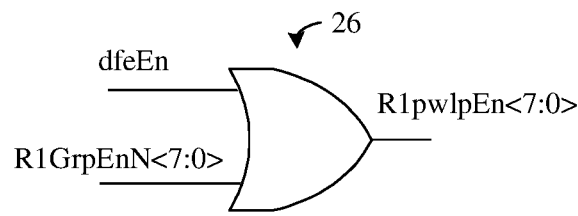

In addition, as shown in FIG. 6E, the first voltage division adjustment circuit 111a further includes a plurality of OR gates 25 and a plurality of OR gates 26. The OR gates 25 and OR gates 26 are used for obtaining fourth signals R0pwlpEn <15:0> after performing OR operation on the mode selection signal dfeEn and the second signals R0GrpEbN <15:0>, and obtaining fifth signals R1pwlpEn<7:0> after performing OR operation on the mode selection signal dfeEn and the third signals R1GrpEbN <7:0>, respectively.

The switching principle of the first mode and the second mode will be explained below.

In the second mode, dfeEn=1, dfeEnN=0. As shown in FIG. 6D, the switch transistor 231 is turned off, and the switch transistor 232 is conducted. The first constant voltage power supply vddq serves as the first power supply terminal, and the results of all OR gates 25 and all OR gates 26 are all 1, that is, the second signals R0pwlpEn <15: 0> and the third signals R1pwlpEn <7: 0> are all 1. As shown in FIG. 6A, at this time, the second switch transistors in the first main resistance chain 21 are all conducted, the resistance distribution state of the first main resistance chain 21 is controlled by the first signals EnV <15: 0> and the inverted signal of the first signals EnVN<15:0>, and one voltage output node is selected to output the third weak voltage signal wakout3 by using the fourth signals R0GrpEbN <15: 0> and the fifth signals R1GrpEbN <7: 0>.

In the first mode, dfeEn=0, dfeEnN=1. As shown in FIG. 6D, the switch transistor 231 is conducted, and the switch transistor 232 is turned off. The first constant current power supply serves as the first power supply terminal. The second signals R0pwlpEn<15: 0> equal to the fourth signals R0GrpEbN <15: 0> correspondingly, and the third signals R1pwlpEn <7: 0> equal to the fifth signals R1GrpEbN <7: 0> correspondingly. That is, only one of the second signals R0pwlpEn <15:0> is 0 and the third signals R1pwlpEn <7:0> is zero, so that a corresponding second switch transistor in FIG. 6A is disconnected, and the nodes on both sides of the second switch transistor (i.e., the first connection point and the second connection point) are selected to output the first weak voltage signal weakout1 and the second weak voltage signal weakout2 respectively.

In some embodiments, as shown in FIG. 5, the second voltage generating circuit 112 includes a second voltage division adjustment circuit 112a, a first operational amplifier 112b, and a second operational amplifier 112c. The second voltage division adjustment circuit 112a includes a second main resistance chain and a second auxiliary resistance chain.

In the first mode, the second main resistance chain and the second auxiliary resistance chain are connected through a third connection point and a fourth connection point. The third connection point is connected in series between the fourth connection point and a ground terminal of the second main resistance chain. The second voltage division adjustment circuit 112a is configured to adjust, based on the second control signal group, a resistance value distribution state of the second main resistance chain to output a first voltage signal through the third connection point, and adjust, based on the second control signal group, a resistance value distribution state of the second auxiliary resistance chain to output a second voltage signal through the fourth connection point. The first operational amplifier 112b is configured to receive the first voltage signal, amplify the first voltage signal and output the first strong voltage signal strgout1. The second operational amplifier 112c is configured to receive the second voltage signal, amplify the second voltage signal and output the second strong voltage signal strgout2.

In the second mode, the second main resistance chain and the second auxiliary resistance chain are in an isolated state. The second voltage division adjustment circuit is further configured to adjust, based on the second control signal group, the resistance value distribution state of the second main resistance chain to output a third voltage signal through a voltage output node of the second main resistance chain. The first operational amplifier 112b is configured to receive the third voltage signal, amplify the third voltage signal and output the third strong voltage signal strgout3.

It should be noted that the structure of the second voltage division adjustment circuit 112a may be implemented with reference to the first voltage division adjustment circuit 111a. In addition, the second voltage generating circuit 112 is additionally provided with an operational amplifier compared with the first voltage generating circuit 111, so as to output a reference voltage signal with a higher driving strength.

Figure 7:
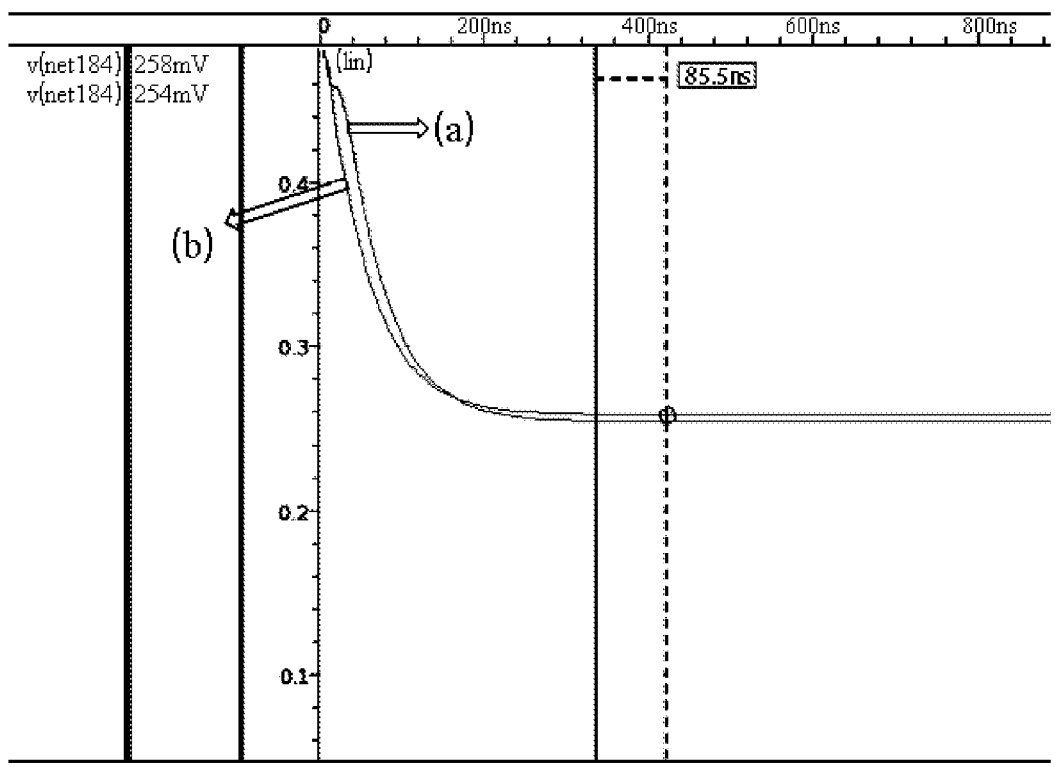
FIG. 7 is a schematic diagram of a simulation test result provided by an embodiment of the present disclosure.

In another embodiment, the first voltage division adjustment circuit (and the second voltage division adjustment circuit) may also adopt a structure of the two-stage main resistance chains, so as to generate two different voltage signals in the first mode. However, the structure of the main and auxiliary resistance chains (i.e., the circuit structure of FIG. 6A to FIG. 6E) generates a larger current value and the setup time is shorter comparing with the structure of the two-stage main resistance chains. Referring to FIG. 7, a schematic diagram of the simulation test result provided by embodiments of the present disclosure is shown. As shown in FIG. 7, curve (a) refers to the voltage change corresponding to the structure of the main and auxiliary resistance chains, and curve (b) refers to the voltage change corresponding to the circuit structure of the two-stage main resistance chains. As shown in curves (a) and (b), on the premise that the main and auxiliary resistance chains have a stable output of 254 mV and the two-stage main resistance chains have a stable output of 258 mV, the setup time of the main and auxiliary resistance chains is shortened by 85.5 nanoseconds compared with the two-stage main resistance chains.

The embodiment of the present disclosure provides a circuit for receiving data. A voltage generating circuit in the circuit for receiving data has two working modes. In the first mode, the voltage generating circuit can generate two reference voltage signals with different voltage values, and can select an appropriate reference voltage signal when judging the data signal, so as to compensate the influence of the previous data signal on the voltage of the current data signal, which not only improves the receiving correctness of the data signal but also has a faster speed. In the second mode, the voltage generating circuit can generate a reference voltage signal, and can adjust the reference voltage signal according to the level state of the previous data signal to compensate the influence of the previous data signal on the voltage of the current data signal.

Figure 8:
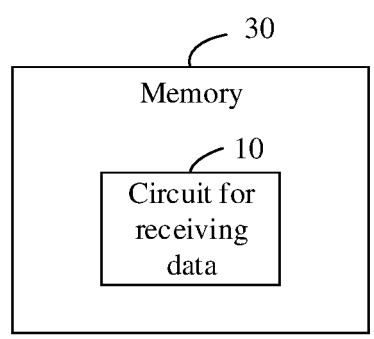
FIG. 8 is a schematic diagram of a structure of a memory provided by an embodiment of the present disclosure.

In another embodiment of the present disclosure, FIG. 8 shows a schematic diagram of a structure of a memory 30 provided by the embodiment of the present disclosure. As shown in FIG. 8, the memory 30 includes the above circuit for receiving data 10.

It should be noted that the voltage generating circuit of the circuit for receiving data 10 generates two reference voltage signals or one reference voltage signal by using the structures of FIG. 6A to FIG. 6E. Specifically, in the second mode, the first main resistance chain adopts a constant voltage power supply vddq, the first auxiliary resistance chain is not connected, and only one output is reserved, so as to subsequently generate a third reference voltage signal. In the first mode, the first main resistance chain adopts a constant current power supply, i.e. the change of the number of resistors does not affect the current of the first main resistance chain. At this time, the first auxiliary resistance is connected to the first main resistance chain, there are two outputs and the voltage difference between the two outputs is the voltage division of the first auxiliary resistance chain, so as to subsequently generate a first reference voltage signal and a second reference voltage signal. In this way, not only the second reference voltage signal (or the third reference voltage signal) can implement a certain range of programmable changes, but also the voltage difference between the first reference voltage signal and the second reference voltage signal can achieve a certain range of programmable changes. At the same time, the structures of FIG. 6A to FIG. 6E uses a wider voltage range than the bias current compensation method, and comparing with the structure of the two-stage main resistance chains, a larger current value is generated and a setup time is shorter.

The above is only a preferred embodiment of the present disclosure and is not intended to limit the scope of protection of the present disclosure. It should be noted that, in the present disclosure, the terms "including" "comprising" or any other variation thereof are intended to encompass non-exclusive inclusion, such that a process, method, object, or apparatus comprising a set of elements includes not only those elements but also other elements not explicitly listed, or also elements inherent to such a process, method, object, or apparatus. In the absence of further limitations, an element defined by the phrase "includes an . . . " does not preclude the existence of another identical element in the process, method, object or apparatus in which it is included. The above serial numbers of the embodiments of the present disclosure are for description only and do not represent the advantages and disadvantages of the embodiments. The methods disclosed in several method embodiments provided in the present disclosure can be arbitrarily combined without conflict to obtain new method embodiments. Features disclosed in several product embodiments provided in the present disclosure can be arbitrarily combined without conflict to obtain new product embodiments. Features disclosed in several method or device embodiments provided in the present disclosure can be arbitrarily combined without conflict to obtain new method or device embodiments. The above is only the specific implementation of the present disclosure, but the scope of protection of the present disclosure is not limited thereto. Any skilled person familiar with the technical field can easily think of changes or substitutions within the technical scope disclosed in the present disclosure, which should be covered within the scope of protection of the present disclosure. Therefore, the scope of protection of the present disclosure shall be subject to the scope of protection of the claims.

The embodiments of the present disclosure provide a circuit for receiving data and a memory. Two reference voltage signals with different voltage values can be generated by a voltage generating circuit, and only the appropriate judgment result is needed to be selected without real-time feedback adjustment of the reference voltage signal according to the level state of the previous data signal, thus not only ensuring the correctness of data reception, but also shortening the signal feedback time.

The invention claimed is:

1. A circuit for receiving data comprising:
   a voltage generating circuit, configured to output, in a first mode, a first reference voltage signal and a second reference voltage signal, wherein a voltage value of the first reference voltage signal is different from a voltage of the second reference voltage signal;
   a data circuit, configured to receive a data signal, the first reference voltage signal, and the second reference voltage signal, compare the data signal with the first reference voltage signal, output a first target signal, compare the data signal with the second reference voltage signal, and output a second target signal, wherein the data signal is one of a plurality of data signals arranged in series; and
   a selection circuit, configured to receive the first target signal and the second target signal and determine one of the first target signal and the second target signal as a target data signal based on a level state of a previous data signal of the data signal;
   wherein the voltage generating circuit is further configured to output, in a second mode, a third reference voltage signal, wherein a voltage value of the third reference voltage signal is between the voltage value of the first reference voltage signal and the voltage value of the second reference voltage signal, and
   the data circuit is further configured to receive the third reference voltage signal, compare the data signal with the third reference voltage signal, and output the target data signal;
   wherein the voltage generating circuit comprises:
   a first voltage generating circuit, configured to receive a first control signal group, and output, in the first mode, a first weak voltage signal and a second weak voltage signal based on the first control signal group;
   a second voltage generating circuit, configured to receive a second control signal group, and output, in the first mode, a first strong voltage signal and a second strong voltage signal based on the second control signal group;
   a first selector, configured to receive an intensity selection signal, the first weak voltage signal, and the first strong voltage signal, output the first strong voltage signal as the first reference voltage signal when the intensity selection signal is in a first state, or output the first weak voltage signal as the first reference voltage signal when the intensity selection signal is in a second state; and
   a second selector, configured to receive the intensity selection signal, the second weak voltage signal and the second strong voltage signal, and output the second strong voltage signal as the second reference voltage signal when the intensity selection signal is in the first state, or output the second weak voltage signal as the second reference voltage signal when the intensity selection signal is in the second state,
   wherein a driving strength of the first strong voltage signal is greater than a driving strength of the first weak voltage signal, and a driving strength of the second strong voltage signal is greater than a driving strength of the second weak voltage signal.

2. The circuit for receiving data of claim 1, wherein the voltage generating circuit further comprises:
   a first encoding generator, configured to generate the first control signal group; and
   a second encoding generator, configured to generate the second control signal group;
   wherein, in the first mode, a voltage difference between the first weak voltage signal and the second weak voltage signal is a first value, the first value is determined by the first control signal group, a voltage difference between the first strong voltage signal and the second strong voltage signal is a second value, and the second value is determined by the second control signal group, wherein the first value is the same as the second value.

3. The circuit for receiving data of claim 2, wherein the voltage generating circuit further comprises:
   a calibration circuit, configured to receive, in a first mode, the first strong voltage signal and the first weak voltage signal, compare a voltage value of the first strong voltage signal with a voltage value of the first weak voltage signal, and output a first comparison signal;
   wherein the first encoding generator is further configured to receive, in the first mode, the first comparison signal, and adjust the voltage value of the first weak voltage signal step by step by adjusting the first control signal group based on the first comparison signal, so as to cause that the voltage value of the first strong voltage signal is same as the voltage value of the first weak voltage signal, and a voltage value of the second strong voltage signal is same as a voltage value of the second weak voltage signal.

4. The circuit for receiving data of claim 3, wherein
   the first voltage generating circuit is further configured to output, in the second mode, a third weak voltage signal based on the first control signal group;
   the second voltage generating circuit is further configured to output, in the second mode, a third strong voltage signal based on the second control signal group;
   the first selector is further configured to receive the intensity selection signal, the third weak voltage signal and the third strong voltage signal, and output the third strong voltage signal as the third reference voltage signal when the intensity selection signal is in the first state, or output the third weak voltage signal as the third reference voltage signal when the intensity selection signal is in the second state;
   wherein a driving strength of the third strong voltage signal is greater than a driving strength of the third weak voltage signal.

5. The circuit for receiving data of claim 4, wherein
   the calibration circuit is further configured to receive the third strong voltage signal and the third weak voltage signal, compare a voltage value of the third strong voltage signal with a voltage value of the third weak voltage signal, and output a second comparison signal;
   the first encoding generator is further configured to receive the second comparison signal, and adjust the voltage value of the third weak voltage signal step by step by adjusting the first control signal group based on the second comparison signal, so as to cause that the voltage value of the third strong voltage signal is same as the voltage value of the third weak voltage signal.

6. The circuit for receiving data of claim 5, wherein the first voltage generating circuit comprises a first voltage division adjustment circuit, and the first voltage division adjustment circuit comprises a first main resistance chain and a first auxiliary resistance chain;
   wherein, in the first mode, the first main resistance chain and the first auxiliary resistance chain are connected through a first connection point and a second connection point, and the first connection point is connected in series between the second connection point and a ground terminal of the first main resistance chain, wherein the first voltage division adjustment circuit is configured to adjust, based on the first control signal group, a resistance value distribution state of the first main resistance chain to output the first weak voltage signal through the first connection point, and adjust, based on the first control signal group, a resistance value distribution state of the first auxiliary resistance chain to output the second weak voltage signal through the second connection point.

7. The circuit for receiving data of claim 6, wherein, in the second mode, the first main resistance chain and the first auxiliary resistance chain are in an isolated state, wherein the first voltage division adjustment circuit is further configured to adjust, based on the first control signal group, the resistance value distribution state of the first main resistance chain to output the third weak voltage signal through a voltage output node of the first main resistance chain.

8. The circuit for receiving data of claim 7, wherein the first main resistance chain comprises a plurality of first resistors arranged in series, one terminal of a first one of the first resistors is connected to a first power supply terminal, the other terminal of a last one of the first resistors is connected to a ground terminal, the first main resistance chain further comprises A number of first switch transistors close to the first power supply terminal and A number of first switch transistors close to the ground terminal, first terminals of the A number of first switch transistors close to the first power supply terminal are all connected to the first power supply terminal, and first terminals of the A number of first switch transistors close to the ground terminal are all connected to the ground terminal, a number of first resistors close to the first power supply terminal and A number of first resistors close to the ground terminal are marked as first edge resistors, in a direction close to the first power supply terminal, an ath first switch transistor is configured to short circuit a number of first edge resistors; in a direction away from the first power supply terminal, an ath first switch transistor is configured to short circuit a number of first edge resistors, both a and A are positive integers, a is less than or equal to A, and A is less than half of total number of the first resistors, in a part of the first main resistance chain which does not contain the first edge resistances, a voltage output node is led out every C number of first resistors, the first voltage generating circuit further comprises a first selection output circuit, an input terminal of the first selection output circuit is connected to all voltage output nodes, and the first selection output circuit is configured to control conduction or turnoff of the first switch transistors based on the first control signal group, in the second mode, the first selection output circuit is further configured to select one of the voltage output nodes based on the first control signal group to output a preset third weak voltage signal.

9. The circuit for receiving data of claim 8, wherein in the first main resistance chain, a second switch transistor is connected in series between two first resistors corresponding to each voltage output node, the first auxiliary resistance chain comprises NXB number of second resistors connected in series, the first auxiliary resistance chain further comprises B number of third switch transistors, one terminal of each of the B number of third switch transistors is connected to a same terminal of the first auxiliary resistance chain, a bth third switch transistor is configured to short circuit Nxb number of second resistors, N, B and b are all positive integers, b is less than or equal to B, and N is not equal to C, the first voltage generating circuit further comprises a second selection output circuit, the second selection output circuit is configured to control conduction or turnoff of the second switch transistors and the third switch transistors based on the first control signal group, in the first mode, the second selection output circuit is specifically configured to control any one of the second switch transistors to be turned off, so as to cause that the first auxiliary resistance chain, instead of one of the second resistors, is connected in series to the first main resistance chain, and form the first connection point and the second connection point, and output a preset first weak voltage signal through the first connection point, and output a preset second weak voltage signal through the second connection point.

10. The circuit for receiving data of claim 8, wherein the first voltage division adjustment circuit further comprises a first constant current power supply and a first constant voltage power supply, wherein the first voltage division adjustment circuit is configured to determine, in the first mode, the first constant current power supply as the first power supply terminal, or determine, in the second mode, the first constant voltage power supply as the first power supply terminal.

11. The circuit for receiving data of claim 5, wherein the second voltage generating circuit comprises a second voltage division adjustment circuit, a first operational amplifier and a second operational amplifier, and the second voltage division adjustment circuit comprises a second main resistance chain and a second auxiliary resistance chain, wherein, in the first mode, the second main resistance chain and the second auxiliary resistance chain are connected through a third connection point and a fourth connection point, and the third connection point is connected in series between the fourth connection point and a ground terminal of the second main resistance chain, wherein the second voltage division adjustment circuit is configured to adjust, based on the second control signal group, a resistance value distribution state of the second main resistance chain to output a first voltage signal through the third connection point, and adjust, based on the second control signal group, a resistance value distribution state of the second auxiliary resistance chain to output a second voltage signal through the fourth connection point, wherein the first operational amplifier is configured to receive the first voltage signal, amplify the first voltage signal and output the first strong voltage signal;

wherein the second operational amplifier is configured to receive the second voltage signal, amplify the second voltage signal and output the second strong voltage signal.

12. The circuit for receiving data of claim 11, wherein, in the second mode, the second main resistance chain and the second auxiliary resistance chain are in an isolated state, wherein the second voltage division adjustment circuit is further configured to adjust, based on the second control signal group, the resistance value distribution state of the second main resistance chain to output a third voltage signal through a voltage output node of the second main resistance chain, wherein the first operational amplifier is configured to receive the third voltage signal, amplify the third voltage signal and output the third strong voltage signal.

13. A memory comprising a circuit for receiving data, wherein the circuit for receiving data comprises:
   a voltage generating circuit, configured to output, in a first mode, a first reference voltage signal and a second reference voltage signal, wherein a voltage value of the first reference voltage signal is different from a voltage of the second reference voltage signal;
   a data circuit, configured to receive a data signal, the first reference voltage signal, and the second reference voltage signal, compare the data signal with the first reference voltage signal, output a first target signal, compare the data signal with the second reference voltage signal, and output a second target signal, wherein the data signal is one of a plurality of data signals arranged in series; and
   a selection circuit, configured to receive the first target signal and the second target signal and determine one of the first target signal and the second target signal as a target data signal based on a level state of a previous data signal of the data signal;
   wherein the voltage generating circuit is further configured to output, in a second mode, a third reference voltage signal, wherein a voltage value of the third reference voltage signal is between the voltage value of the first reference voltage signal and the voltage value of the second reference voltage signal, and
   the data circuit is further configured to receive the third reference voltage signal, compare the data signal with the third reference voltage signal, and output the target data signal;
   wherein the voltage generating circuit comprises: a first voltage generating circuit, configured to receive a first control signal group, and output, in the first mode, a first weak voltage signal and a second weak voltage signal based on the first control signal group;
   a second voltage generating circuit, configured to receive a second control signal group, and output, in the first mode, a first strong voltage signal and a second strong voltage signal based on the second control signal group;
   a first selector, configured to receive an intensity selection signal, the first weak voltage signal, and the first strong voltage signal, output the first strong voltage signal as the first reference voltage signal when the intensity selection signal is in a first state, or output the first weak voltage signal as the first reference voltage signal when the intensity selection signal is in a second state; and
   a second selector, configured to receive the intensity selection signal, the second weak voltage signal and the second strong voltage signal, and output the second strong voltage signal as the second reference voltage signal when the intensity selection signal is in the first state, or output the second weak voltage signal as the second reference voltage signal when the intensity selection signal is in the second state,
   wherein a driving strength of the first strong voltage signal is greater than a driving strength of the first weak voltage signal, and a driving strength of the second strong voltage signal is greater than a driving strength of the second weak voltage signal.

14. The memory of claim 13, wherein the voltage generating circuit further comprises:
   a first encoding generator, configured to generate the first control signal group; and
   a second encoding generator, configured to generate the second control signal group;
   wherein, in the first mode, a voltage difference between the first weak voltage signal and the second weak voltage signal is a first value, the first value is determined by the first control signal group, a voltage difference between the first strong voltage signal and the second strong voltage signal is a second value, and the second value is determined by the second control signal group, wherein the first value is the same as the second value.

15. The memory of claim 14, wherein the voltage generating circuit further comprises:
   a calibration circuit, configured to receive, in a first mode, the first strong voltage signal and the first weak voltage signal, compare a voltage value of the first strong voltage signal with a voltage value of the first weak voltage signal, and output a first comparison signal;
   wherein the first encoding generator is further configured to receive, in the first mode, the first comparison signal, and adjust the voltage value of the first weak voltage signal step by step by adjusting the first control signal group based on the first comparison signal, so as to cause that the voltage value of the first strong voltage signal is same as the voltage value of the first weak voltage signal, and a voltage value of the second strong voltage signal is same as a voltage value of the second weak voltage signal.

16. The memory of claim 15, wherein
   the first voltage generating circuit is further configured to output, in the second mode, a third weak voltage signal based on the first control signal group;
   the second voltage generating circuit is further configured to output, in the second mode, a third strong voltage signal based on the second control signal group,
   the first selector is further configured to receive the intensity selection signal,
   the third weak voltage signal and the third strong voltage signal, and output the third strong voltage signal as the third reference voltage signal when the intensity selection signal is in the first state, or output the third weak voltage signal as the third reference voltage signal when the intensity selection signal is in the second state;
   wherein a driving strength of the third strong voltage signal is greater than a driving strength of the third weak voltage signal.

* * * * *